US011796906B2

(12) United States Patent
Murakami et al.

(10) Patent No.: US 11,796,906 B2
(45) Date of Patent: Oct. 24, 2023

(54) LENS APPARATUS AND IMAGE PICKUP APPARATUS

(71) Applicant: CANON KABUSHIKI KAISHA, Tokyo (JP)

(72) Inventors: Taro Murakami, Musashino (JP); Takumi Uehara, Kawasaki (JP); Hiroki Ito, Hiratsuka (JP); Atsuto Noda, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 531 days.

(21) Appl. No.: 17/019,404

(22) Filed: Sep. 14, 2020

(65) Prior Publication Data

US 2021/0088893 A1  Mar. 25, 2021

(30) Foreign Application Priority Data

Sep. 19, 2019 (JP) ................... 2019-170173
Jun. 16, 2020 (JP) ................... 2020-103751

(51) Int. Cl.
*G03B 35/18* (2021.01)
*G02B 15/14* (2006.01)
(Continued)

(52) U.S. Cl.
CPC ............. *G03B 35/18* (2013.01); *G02B 15/14* (2013.01); *G03B 17/14* (2013.01); *G02B 7/09* (2013.01)

(58) Field of Classification Search
CPC ........ G03B 35/00; G03B 35/18; G03B 37/00; G03B 17/14; G03B 35/08; G03B 17/17;
(Continued)

(56) References Cited

U.S. PATENT DOCUMENTS 6,337,773 B1   1/2002  Kawano et al.
6,888,563 B2*  5/2005  Suzuki ................ H04N 13/211
                                                      348/42
(Continued)

FOREIGN PATENT DOCUMENTS

CN    101482693 A    7/2009
CN    101937168 A    1/2011
(Continued)

OTHER PUBLICATIONS

Aug. 23, 2022 Office Action in Japanese Patent Application No. 2020-103751 (with English translation).
(Continued)

*Primary Examiner* — William R Alexander
(74) *Attorney, Agent, or Firm* — Venable LLP

(57) ABSTRACT

A lens apparatus includes a first optical system, a second optical system disposed in parallel with the first optical system, and a lens mount attachable to a camera body. Each of the first optical system and the second optical system has a first optical axis, a second optical axis, and a third optical axis in order from an object side to an image side. A distance between the first optical axis of the first optical system and the first optical axis of the second optical system is longer than a diameter of the lens mount, and a distance between the third optical axis of the first optical system and the third optical axis of the second optical system is shorter than the diameter of the lens mount.

26 Claims, 7 Drawing Sheets

(51) Int. Cl.
*G03B 17/14* (2021.01)
*G02B 7/09* (2021.01)

(58) Field of Classification Search
CPC . G02B 15/14; G02B 7/09; G02B 7/04; H04N 23/55; H04N 23/698; H04N 2213/001; H04N 13/218; H04N 13/239
See application file for complete search history.

(56) References Cited

U.S. PATENT DOCUMENTS

| | | | |
|---|---|---|---|
| 8,743,185 B2 | 6/2014 | Yamaguchi et al. | |
| 8,878,911 B2* | 11/2014 | Wakazono | G03B 35/02 348/49 |
| 9,380,273 B1* | 6/2016 | Jensen | G06T 5/001 |
| 2002/0021354 A1* | 2/2002 | Suzuki | H04N 13/122 348/E13.067 |
| 2011/0310230 A1 | 12/2011 | Cheng | |
| 2011/0310231 A1 | 12/2011 | Yamaguchi et al. | |
| 2012/0113233 A1 | 5/2012 | Yamaguchi et al. | |
| 2013/0057732 A1* | 3/2013 | Uemura | G02B 15/1461 348/E5.051 |
| 2013/0170029 A1* | 7/2013 | Morita | G03B 17/565 359/464 |
| 2015/0181089 A1 | 6/2015 | Mirlay | |
| 2015/0229815 A1 | 8/2015 | Nonaka et al. | |
| 2018/0316907 A1 | 11/2018 | Azuma et al. | |
| 2022/0007002 A1* | 1/2022 | Uehara | H04N 13/296 |

FOREIGN PATENT DOCUMENTS

| | | | | |
|---|---|---|---|---|
| CN | 206725955 U | 12/2017 | | |
| EP | 3147700 A1 | 3/2017 | | |
| FR | 2975794 A1 | 11/2012 | | |
| JP | H09-026635 A | 1/1997 | | |
| JP | 2001318442 A | * | 11/2001 | ............ G02B 15/12 |
| JP | 2002-090921 A | 3/2002 | | |
| JP | 2011-257633 A | 12/2011 | | |
| JP | 2012-003022 A | 1/2012 | | |
| JP | 2012-113281 A | 6/2012 | | |
| JP | 2012-242488 A | 12/2012 | | |
| JP | 2013-097280 A | 5/2013 | | |
| JP | 2014-026001 A | 2/2014 | | |
| JP | 2018-189636 A | 11/2018 | | |
| JP | 2002-077945 A | 3/2022 | | |
| WO | 2011/086890 A1 | 7/2011 | | |
| WO | 2012/014454 A1 | 2/2012 | | |
| WO | WO-2018048185 A1 | * | 3/2018 | ............ G02B 27/01 |

OTHER PUBLICATIONS

May 5, 2022 Office Action in Chinese Patent Application No. 202010985315.1 (with English translation).
Jun. 17, 2021 Extended European Search Report in European Patent Appln. No. 20196601.7.
Feb. 5, 2021 European Partial Search Report in European Patent Appln. No. 20196601.7.
Aug. 8, 2023 European Official Action in European Patent Appln. No. 20196601.7.

* cited by examiner

LENS APPARATUS AND IMAGE PICKUP APPARATUS

BACKGROUND OF THE INVENTION

Field of the Invention

The present invention relates to a lens apparatus and an image pickup apparatus, each of which can provide stereoscopic imaging.

Description of the Related Art

Japanese Patent Laid-Open No. ("JP") 2012-3022 discloses a stereoscopic imaging optical system that includes two optical systems spaced in parallel by a predetermined distance (baseline length), and images two image circles in parallel on a single image sensor. A viewer of the image can feel the stereoscopic effect more strongly as the baseline length becomes longer. The baseline length that gives the natural stereoscopic effect is determined according to the distance to the object, and if an image is taken with a baseline length in a range of ½₀ to ½₁₀₀ of the distance to the object, the natural stereoscopic effect is obtained. If the baseline length is longer than this range, the stereoscopic effect is too strong, while if the baseline length is shorter than this range, the stereoscopic effect is too weak. In order to change the baseline length, it is necessary to bring these two optical systems close to or away from each other. However, when the images of the two optical systems are formed side by side on the single image sensor, these images cannot be separated beyond the light receiving range of the image sensor, and on the other hand, they cannot be closer to each other so that these two images overlap each other.

Accordingly, JP 2012-113281 discloses a stereoscopic imaging optical system that can change the baseline length without moving two images positions arranged on the image sensor by biasing diaphragms (aperture stops) in the right-eye and left-eye optical systems to their optical axes.

However, the stereoscopic imaging optical system disclosed in JP 2012-113281 cannot change the baseline length with the diaphragm open. A variable range of the baseline length in this stereoscopic imaging optical system is limited to a range of the open diameter of the diaphragm. Since the stereoscopic imaging optical systems disclosed in JPs 2012-3022 and 2012-113281 provide two independent optical systems in the lens mounts, it is necessary to increase the diameter of the lens mount in order to increase the baseline length as the distance between the two optical systems.

An average interval between human eyes is about 60 to 65 mm, and in order to obtain the more natural stereoscopic effect similar to that of human eyes, it is necessary to use optical systems having an equivalent baseline length. However, this requires the diameter of the lens mount to be 60 mm or larger, so that the lens apparatus and the image pickup apparatus become large.

SUMMARY OF THE INVENTION

The present invention provides a compact lens apparatus and image pickup apparatus, each of which can obtain a natural stereoscopic effect by properly setting a baseline length.

A lens apparatus according to one aspect of the present invention includes a first optical system, a second optical system disposed in parallel with the first optical system, and a lens mount attachable to a camera body. Each of the first optical system and the second optical system has a first optical axis, a second optical axis, and a third optical axis in order from an object side to an image side. A distance between the first optical axis of the first optical system and the first optical axis of the second optical system is longer than a diameter of the lens mount, and a distance between the third optical axis of the first optical system and the third optical axis of the second optical system is shorter than the diameter of the lens mount.

An image pickup apparatus having the above lens apparatus also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

A lens apparatus (interchangeable lens) according to this embodiment has two optical systems (such as a first optical system and a second optical system) arranged in parallel (symmetrically), and is configured so that two image circles are formed in parallel on a single image sensor. The two optical systems are arranged in the horizontal direction and spaced by a predetermined distance (baseline length). When viewed from the image side, the image formed by the right optical system (first optical system) is recorded as a motion image or still image for the right eye, and the image formed by the left optical system (second optical system) is recorded as a motion image or still image for the left eye. In reproducing a motion image or a still image (video), viewing with a known 3D display or so-called VR goggles, the viewer's right eye views the right-eye image and his left eye views the left-eye image. At this time, images with a parallax are projected on the right eye and the left eye according to the baseline length of the lens apparatus, so that the viewer can obtain a stereoscopic effect. Thus, the lens apparatus according to this embodiment is a lens apparatus for stereoscopic photography capable of forming two images with a parallax through the first and second optical systems.

Figure 1:
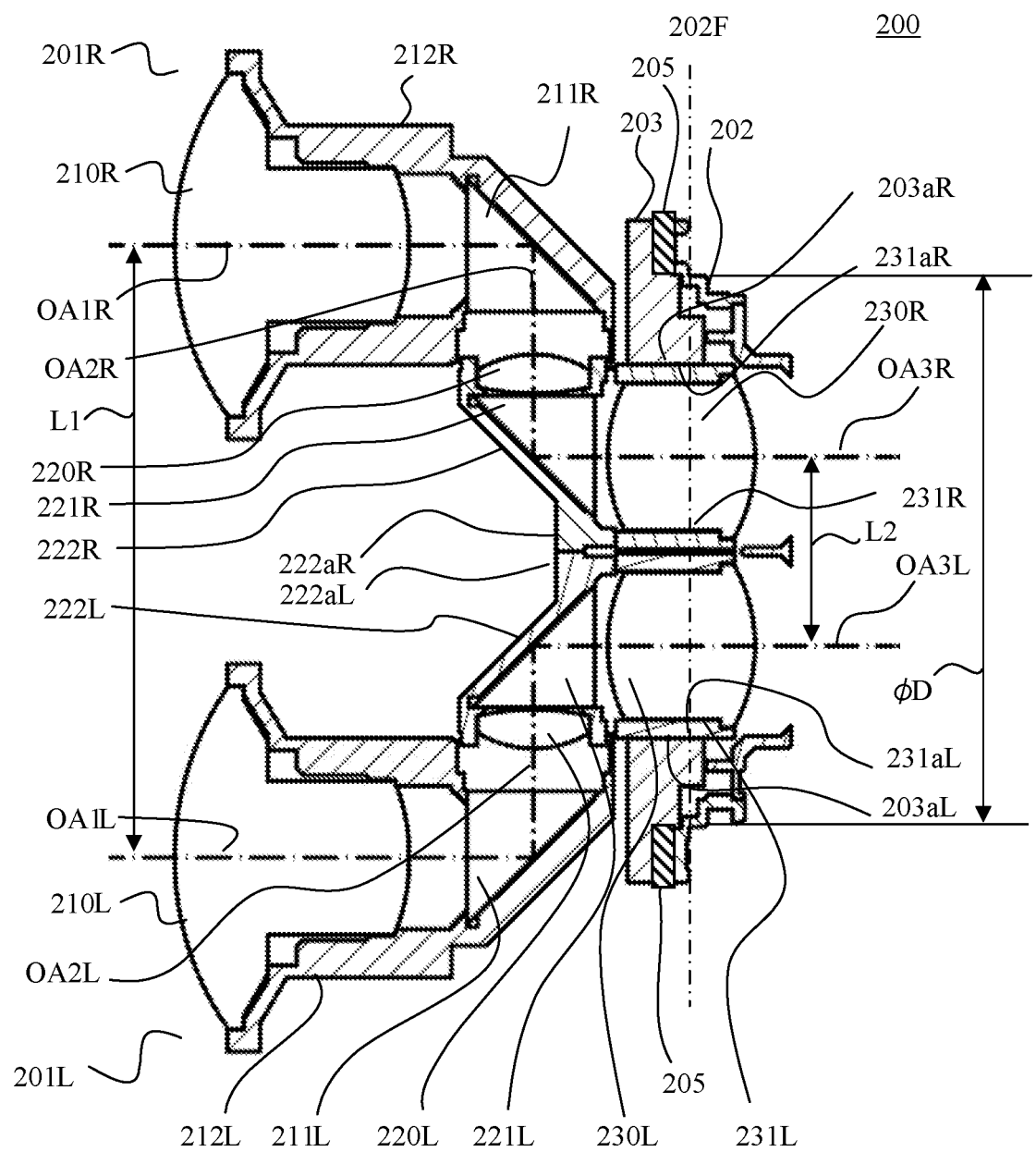
FIG. 1 is a sectional view of a lens apparatus according to this embodiment.
Figure 2:
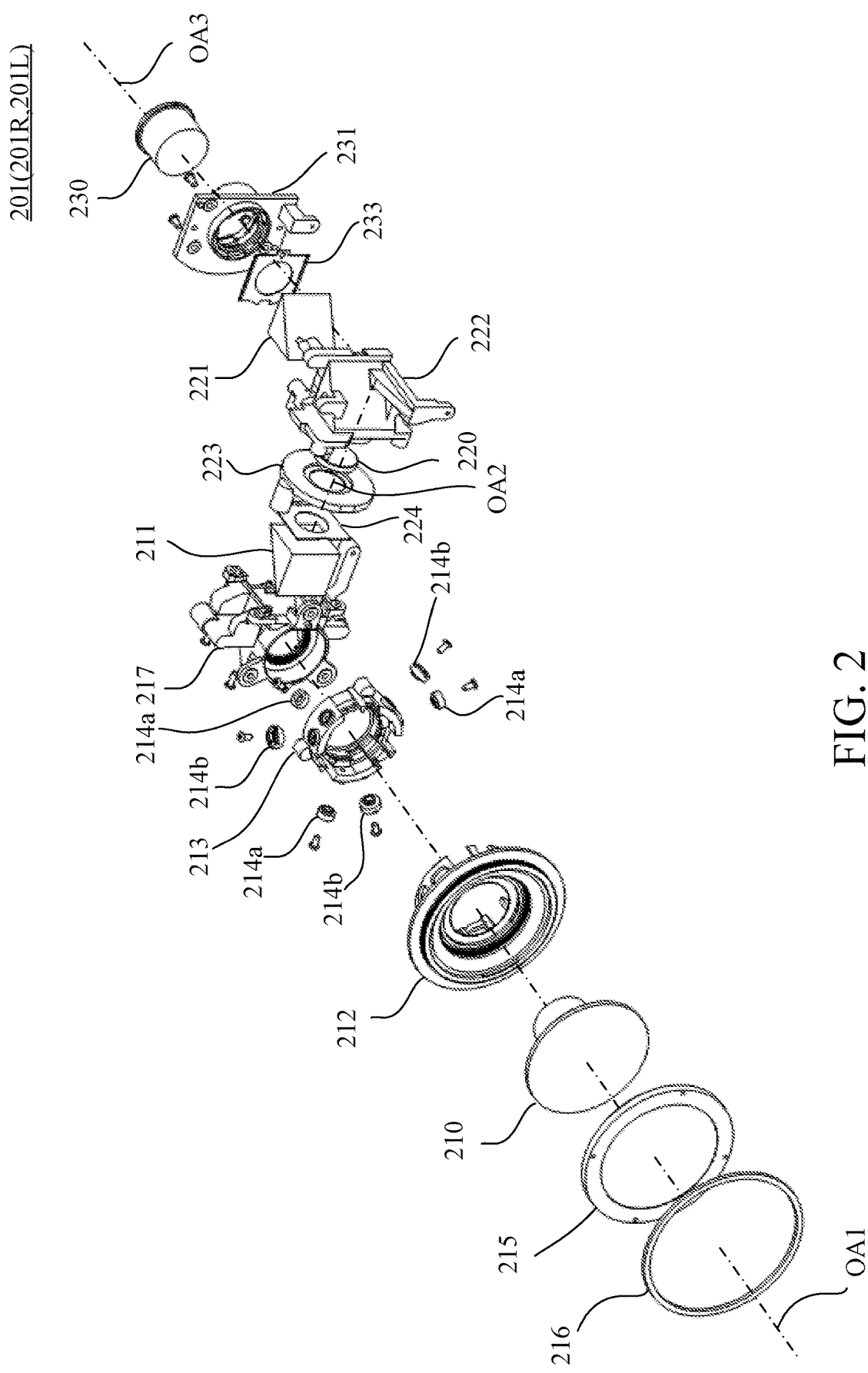
FIG. 2 is an exploded perspective view of an optical system according to this embodiment.
Figure 3:
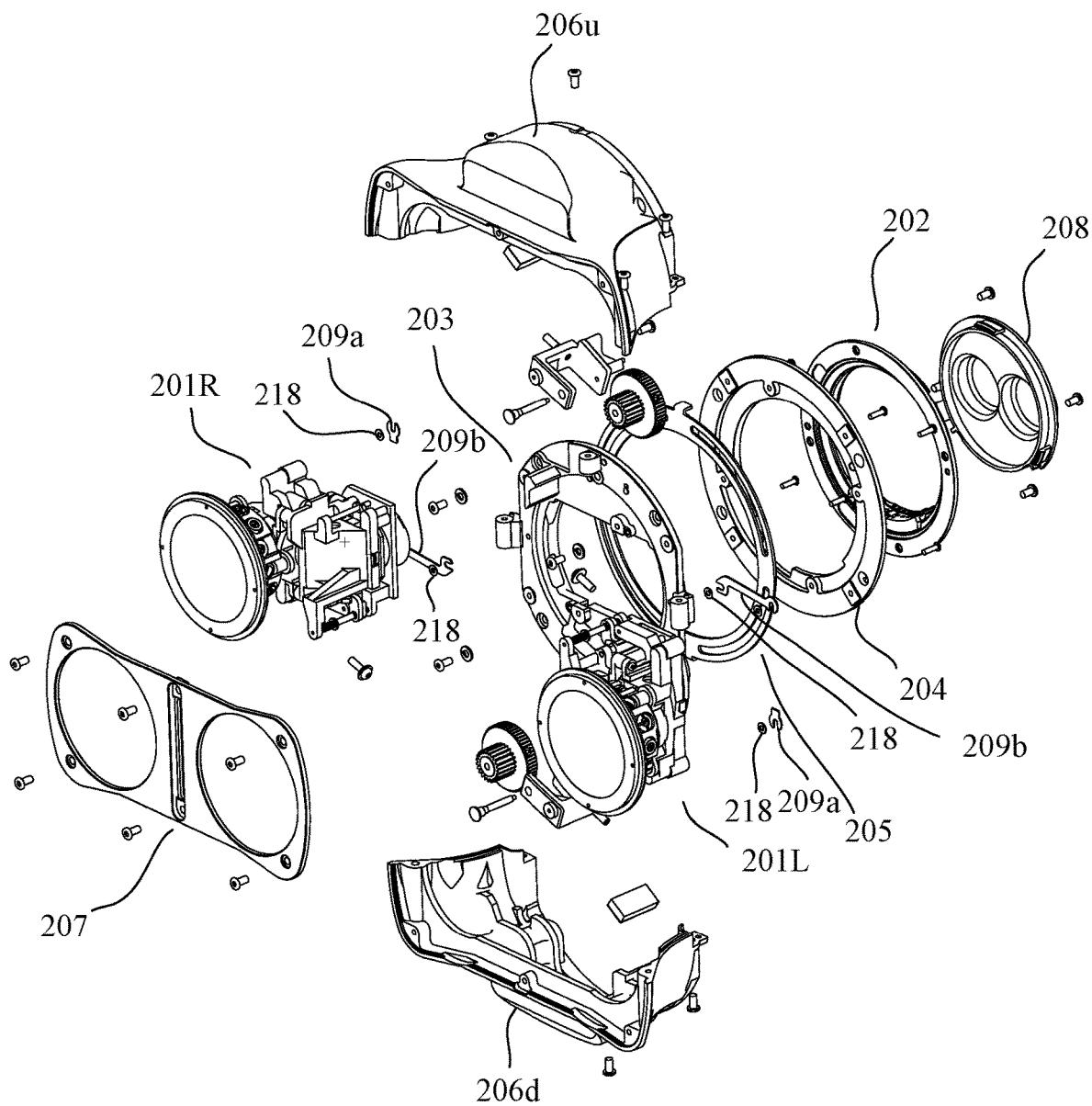
FIG. 3 is an exploded perspective view of the lens apparatus according to this embodiment.
Figure 4:
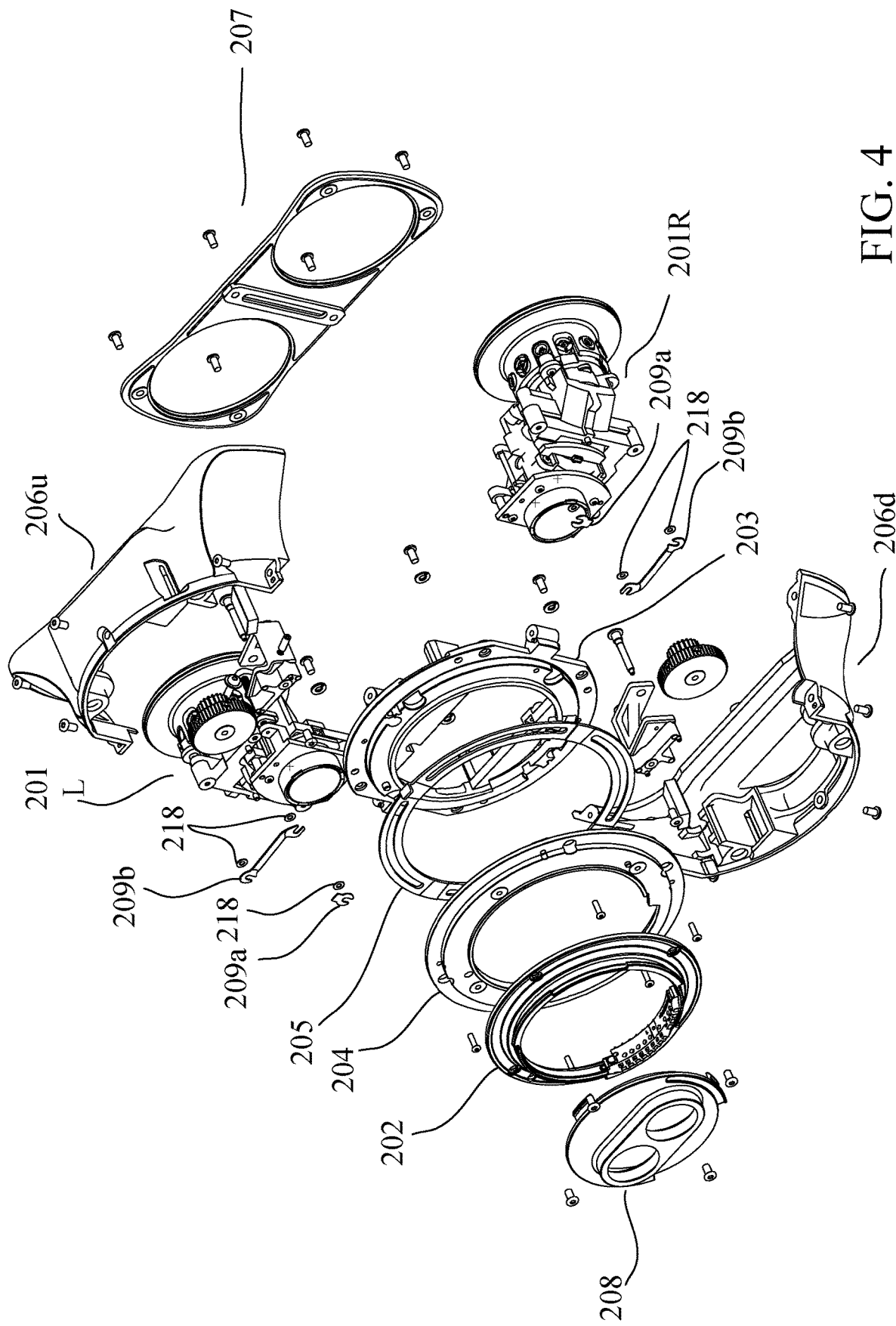
FIG. 4 is another exploded perspective view of the lens apparatus according to this embodiment.

Referring now to FIGS. 1 to 4, a description will be given of a configuration of a lens apparatus (interchangeable lens) 200 according to this embodiment. FIG. 1 is a sectional view of the lens apparatus 200 and illustrates schematic configurations of a right-eye optical system 201R and a left-eye optical system 201L in the lens apparatus 200. FIG. 2 is an exploded perspective view of one (single-eye) optical system among the right-eye optical system 201R and the left-eye optical system 201L. FIG. 3 is an exploded perspective view of the lens apparatus 200 as viewed from the object side. FIG. 4 is an exploded perspective view of the lens apparatus 200 viewed from the image side. In the following description, the right-eye optical system will be suffixed with R, and the left-eye optical system will be suffixed with L. The description common to both the right-eye and left-eye optical systems do not include R or L at the end of the reference numeral.

The lens apparatus 200 includes the right-eye optical system (first optical system) 201R and the left-eye optical system (second optical system) 201L. The right-eye optical system 201R and the left-eye optical system 201L are two optical systems arranged in parallel (symmetrically). The right-eye optical system 201R and the left-eye optical system 201L have, in order from the object side to the image side, first optical axes OA1R and OA1L, second optical axes OA2R and OA2L approximately orthogonal to the first optical axes, and third optical axes OA3R and OA3L approximately parallel to the first optical axes. Here, the term "approximately orthogonal or approximately parallel" is meant to include not only a strictly orthogonal or parallel configuration but also a configuration that is evaluated to be substantially orthogonal or parallel.

The right-eye optical system 201R and the left-eye optical system 201L include first-unit lenses (first lenses) 210R and 210L, second-unit lenses (second lenses) 220R and 220L, and third-unit lenses (third lenses) 230R and 230L along the optical axes. The first-unit lenses 210R and 210L are disposed on the first optical axes OA1R and OA1L, the second-unit lenses 220R and 220L are disposed on the second optical axes OA2R and OA2L, and the third-unit lenses 230R and 230L are the third optical axes OA3R and OA3L.

The right-eye optical system 201R and the left-eye optical system 201L have first prisms (first reflective surfaces) 211R and 211L and second prisms (second reflective surfaces) 221R and 221L, respectively. The first prisms 211R and 211L bend light fluxes of the first optical axes OA1R and OA1L toward those of the second optical axes OA2R and OA2L, respectively. The second prisms 221R and 221L bend light fluxes of the second optical axes OA2R and OA2L toward those of the third optical axes OA3R and OA3L. Thus, the right-eye optical system 201R and the left-eye optical system 201L are bending optical systems. The first prisms 211R and 211L reflect and bend the light fluxes of the first optical axes OA1R and OA1L toward those of the second optical axes OA2R and OA2L. The second prisms 221R and 221L reflect and bend the light fluxes of the second optical axes OA2R and OA2L toward those of the third optical axes OA3R and OA3L.

The right-eye optical system 201R and the left-eye optical system 201L have first-unit lens holders 212R and 212L, second-unit lens holders 222R and 222L, and third-unit lens holders 231R and 231L, respectively. The first-unit lens holders 212R and 212L hold the first-unit lenses 210R and 210L and the first prisms 211R and 211L, respectively. The second-unit lens holders 222R and 222L hold the second-unit lenses 220R and 220L and the second prisms 221R and 221L, respectively. The third-unit lens holders 231R and 231L hold third-unit lenses 230R and 230L, respectively.

The right-eye optical system 201R and the left-eye optical system 201L are fixed to a lens base (lens support member) 203, respectively. The lens base 203 is fixed to a lens mount 202 for connecting the lens apparatus 200 to the camera body 110. In this embodiment, outer circumferential parts 231aR and 231aL of the third-unit lens holders 231R and 231L are engaged with circumferential surfaces 203aR and 203aL of the lens base 203 around the third optical axes OA3R and OA3L as the centers. The second-unit lens holders 222R and 222L of the right-eye optical system 201R and the left-eye optical system 201L are connected to each other via connectors 222aR and 222aL provided to the second-unit lens holders 222R and 222L, respectively.

Reference numeral L1 denotes a distance between the first optical axis OA1R of the right-eye optical system 201R and the first optical axis OA1L of the left-eye optical system 201L, or a baseline length. The longer the baseline length L1 becomes, the stronger the stereoscopic effect becomes in viewing an image. Reference numeral L2 denotes a distance between the third optical axis OA3R of the right-eye optical system 201R and the third optical axis OA3L of the left-eye optical system 201L. φD denotes a diameter (aperture or mount diameter) of the lens mount 202 that can be attached to the camera body, and corresponds to an engagement diameter between the lens mount 202 and a camera mount 122. Reference numeral 202F denotes a flange surface of the lens mount 202.

As illustrated in FIG. 2, each of the right-eye optical system 201R and the left-eye optical system 201L has a first-unit lens holder 212 that holds the first-unit lens 210. The first-unit lens holder 212 is fixed by a press ring 215 and covered with a dustproof member 216 for preventing dust from entering from top of the press ring 215. The first-unit lens 210 is attached to a first-unit lens base 213 via two types of three rollers 214a and two rollers 214b so that tilt decentering of the first-unit lens holder 212 can be optically adjusted.

The first prism 211 is attached and adhered to a prism base 217 from a direction along the second optical axis OA2. A prism mask 224 is attached to the prism surface of the first prism 211 to block light rays outside the optical path. The prism base 217 and the first-unit lens base 213 are fixed with unillustrated screws. The second-unit lens 220 is attached and adhered to the second-unit lens holder 222 from the direction along the second optical axis OA2. The second prism 221 is attached and adhered to the second-unit lens holder 222 from the direction along the third optical axis OA3. A prism mask 233 is pasted onto the prism surface of the second prism 221 to shield light rays outside the optical path.

A diaphragm (aperture stop) unit 223 is disposed between the second-unit lens holder 222 and the prism base 217. The prism base 217 is screwed and fixed onto the second-unit lens holder 222. The third-unit lens 230 is held by the third-unit lens holder 231, and is screwed and fixed onto the second-unit lens holder 222.

As illustrated in FIGS. 3 and 4, the right-eye optical system 201R and the left-eye optical system 201L are screwed and fixed onto the lens base 203. Two types of spacers 209a and 209b and a washer 218 are sandwiched between each of the two optical systems or the right-eye optical system 201R and the left-eye optical system 201L, and the lens base 203. Adjusting the thickness of each of the spacers 209a and 209b and the washer 218 can suppress the focus fluctuations caused by the manufacturing errors of the two left and right optical systems so that the two optical systems can have the same focus positions.

Figure 7:
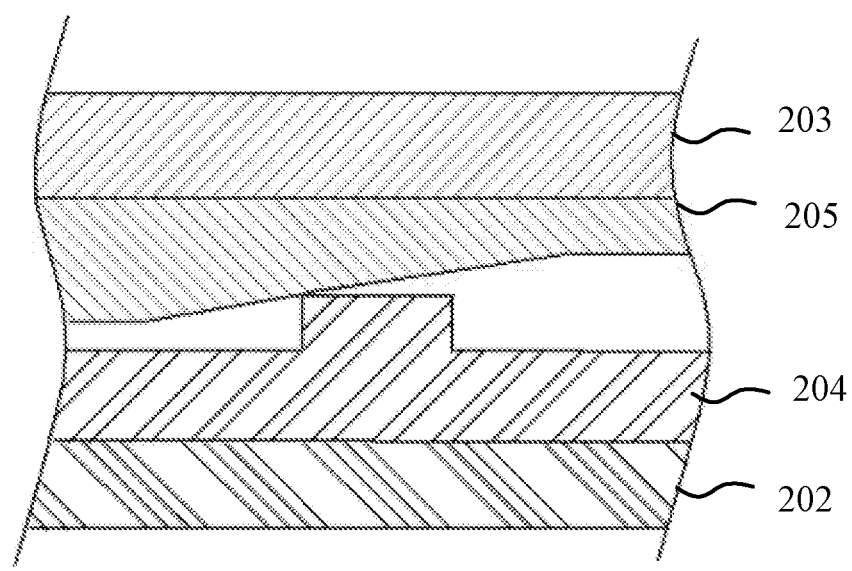
FIG. 7 schematically illustrates a focusing unit in the image pickup apparatus according to this embodiment.

FIG. 7 schematically illustrates a focusing unit in the image pickup apparatus 100. As illustrated in FIG. 7, the lens base 203 is fixed to the lens mount 202 for mounting on the camera mount 122 of the camera body 110, via a focus flange 204 and a focus ring (operation member) 205. The focus ring 205 is a member whose thickness changes like a cam depending on an angle of rotation. Rotating the focus ring 205 can change a distance between the focus flange 204 and the lens base 203.

In this way, the focus ring 205 is formed with a cam shape having a different thickness depending on a rotation phase. The right-eye optical system 201R and the left-eye optical system 201L are fixed to the lens base 203, and when the focus ring 205 is operated, the lens base 203 moves back and forth. In other words, since the cam shape of the focus ring 205 is sandwiched between the lens base 203 and the lens mount 202, the lens base 203 moves back and forth as the focus ring 205 is rotated.

This configuration can entirely project or retract the entire right-eye optical system 201R and left-eye optical system 201L of the lens apparatus 200 can be extended or retracted. In other words, operating the focus ring 205 provides focusing of both the right-eye optical system 201R and the left-eye optical system 201L. Thereby, focusing can be made, and the right-eye optical system 201R and the left-eye optical system 201L can be focused at the same time. The right-eye optical system 201R and the left-eye optical system 201L are independently focusable.

In the first-unit lens 210 in the lens apparatus 200 according to this embodiment, a diameter of a lens closer to the object is larger, so that the size in the width direction of the lens apparatus 200 also spreads toward the object side in a trumpet shape. Hence, when the focus ring 205 is located outside the first-unit lens of the left and right optical systems, the diameter of the focus ring 205 becomes large. If the outer diameter of the focus ring 205 projects from the bottom surface of the camera, an attachment to a tripod may become difficult. When the optical system has a wide-angle lens such as a fisheye lens and the focus ring 205 is disposed closer to the object of the lens apparatus 200, the hand operating the focus ring 205 may be reflected within the angle of view. On the other hand, the large diameter of the focus ring 205 is advantageous in improving the operational feeling because the operation torque is easily transmitted and in facilitating fine adjustments.

Accordingly, the lens apparatus 200 according to this embodiment disposes the focus ring 205 on the image plane side of the reflective surface of the first prism 211 so that it overlaps the reflective surfaces of the first prisms 211R and 211L when viewed along the first optical axis. The focus ring 205 is rotatably disposed coaxially with the lens mount 202. The third-unit lenses 230R and 230L are located inside the inner diameter of the focus ring 205. This embodiment disposes the focus ring 205 at a position overlapping the first prisms 211R and 211L when viewed along the first optical axis. As a result, the focus ring 205 can be made smaller than the focus ring 205 disposed near the first-unit lenses 210R and 210L, and the outer diameter of the focus ring 205 is prevented from protruding from the bottom surface of the camera body (or it does not protrude from the bottom surface of the camera body). The focus ring 205 coaxial with the lens mount 202 and the lens of the third optical axis located inside the inner diameter of the focus ring 205 can secure the operational feeling equivalent to that of the conventional single interchangeable lens.

The focus ring 205 is not limited to the focusing function (operation member for focusing), but may be replaced with an operation ring having another function, such as a zoom ring (operation member for adjusting an angle of view) and a diaphragm ring (operation member for adjusting an F-number). In that case, the lens base 203 is directly fixed to the focus flange 204 and the lens mount 202 without intervening the focus ring 205.

The third-unit lenses 230R and 230L disposed on the third optical axis OA3 are also disposed so as to enter the inside of the flange surface of the camera mount 122 which is attached across the flange surface 202F of the lens mount 202. In particular, when the lens apparatus 200 according to this embodiment is used for a mirrorless camera as the camera body 110, unlike a single-lens reflex camera, an optical refraction member such as a mirror or a mirror-up operation space is not required. Thus, it is possible to design the lens apparatus 200 so that the lens apparatus 200 largely enters the inside of the camera body 110 rather than the flange surface.

Figure 5:
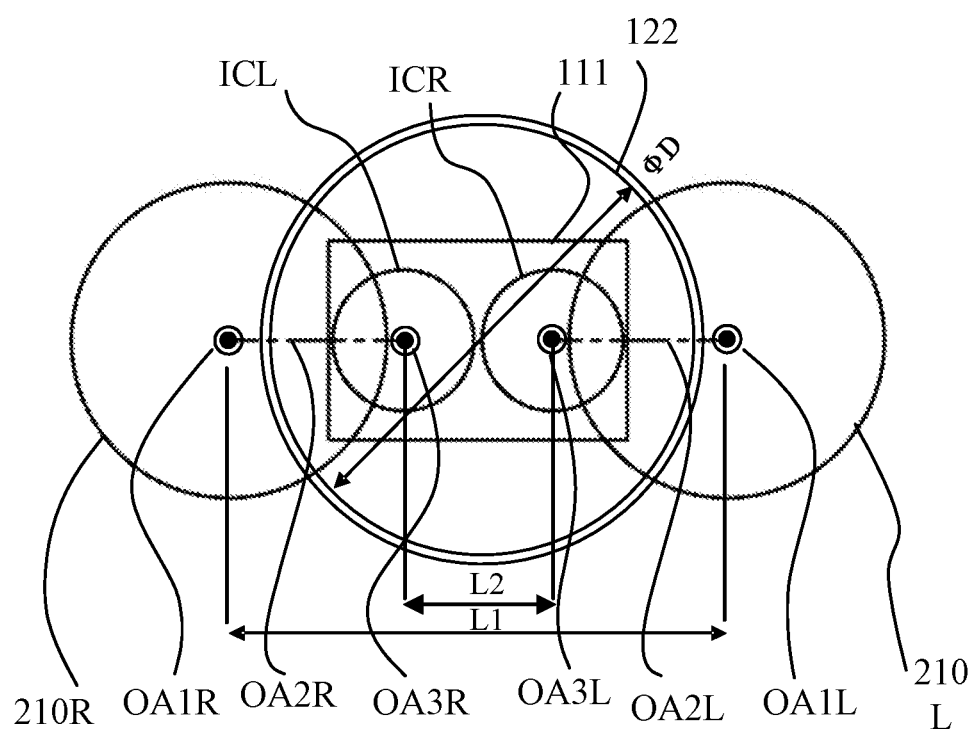
FIG. 5 illustrates a positional relationship between the lens apparatus and an image circle according to this embodiment.

Referring now to FIG. 5, a description will be given of a positional relationship among the position of each optical axis in the lens apparatus 200, the lens mount unit 202, and the image circle on the image sensor 111 in the camera body 110. FIG. 5 illustrates a positional relationship between the lens apparatus 200 and the image circle.

On the image sensor 111 of the camera body 110, two image circles or a right-eye image circle ICR formed by the right-eye optical system 201R and a left-eye image circle ICL formed by the left-eye optical system 201L form images in parallel. The sizes of the image circles and the distance between them may be set so that the two image circles do not overlap each other. For example, assume a light-receiving area of the image sensor 111 is divided into left and right halves at the center, and the center of the right-eye image circle ICR may be located at the approximately center of the right area of the light-receiving area and the center of the left-eye image circle ICL may be located at the approximately center of the left area of the light-receiving area, respectively. The optical system (the right-eye optical system 201R and the left-eye optical system 201L) according to this embodiment is an all-round fish-eye lens (wide-angle fisheye lens), and the image captured on the imaging surface is a circular image made by imaging a range with an angle of view of about 180°, and two circular images are formed on the left and right, respectively.

Figure 6:
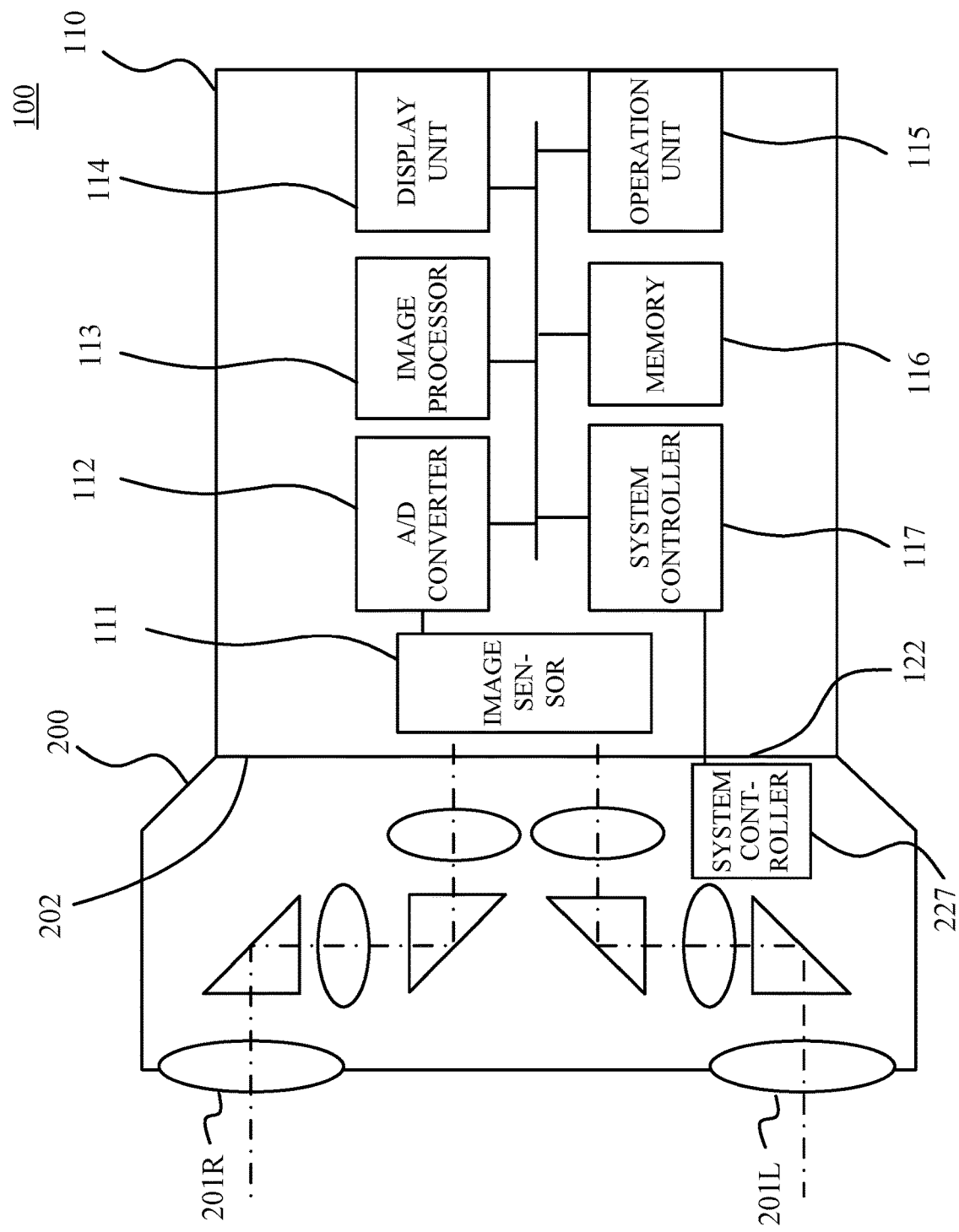
FIG. 6 schematically illustrates an image pickup apparatus according to this embodiment.

Referring now to FIG. 6, a description will be given of the configuration of the image pickup apparatus according to this embodiment. FIG. 6 schematically illustrates the image pickup apparatus 100. The image pickup apparatus 100 can capture a stereoscopic image. The image pickup apparatus 100 includes the camera body 110 and the lens apparatus 200. The lens apparatus 200 is an interchangeable lens that can be attached to and detached from the camera body 110. However, the present invention is not limited to this embodiment, and is applicable to an image pickup apparatus in which the camera body 110 and the lens apparatus 200 are integrated with each other.

The lens apparatus 200 includes the right-eye optical system 201R, the left-eye optical system 201L, and a system controller (lens system controller) 227. The camera body 110 includes the image sensor 111, an A/D converter 112, an image processor 113, a display unit 114, an operation unit 115, a memory 116, a system controller (camera system controller) 117, and the camera mount 122. When the lens apparatus 200 is mounted on the camera mount 122 of the camera body 110 via the lens mount 202, the system controller 117 of the camera body 110 and the system controller 227 of the lens apparatus 200 are electrically connected to each other.

The image of the object is captured on the image sensor 111 which includes the right-eye image (first image) formed through the right-eye optical system 201R and the left-eye image (second image) formed through the left-eye optical system 201L, which are arranged in parallel. The image sensor 111 converts the captured image (optical signal) of the object into an analog electric signal. The A/D converter 112 converts the analog electric signal output from the image sensor 111 into a digital electric signal (image signal). The image processor 113 performs various image processing for the digital electric signal (image signal) output from the A/D converter 112.

The display unit 114 displays various information. The display unit 114 is implemented, for example, by using an electronic viewfinder and a liquid crystal panel. The operation unit 115 serves as a user interface used for a user giving an instruction to the image pickup apparatus 100. When the display unit 114 has a touch panel, the touch panel also constitutes one of the operation units 115. The memory 116 stores various data such as image data that has undergone image processing by the image processor 113. The memory 116 also stores a computer program. The memory 116 is implemented, for example, by using a ROM, a RAM, and an HDD. The system controller 117 centrally controls the entire image pickup apparatus 100. The system controller 117 is implemented, for example, by using a CPU.

For example, assume that the image sensor 111 has a size (sensor size) of 24 mm in length×36 mm in width, the image circle has a diameter of φ17 mm, a distance between the left and right third optical axes OA3 is 18 mm, and the left and right second optical axes OA2 are as long as 21 mm. When the right-eye optical system 201R and the left-eye optical system 201L are arranged so that the second optical axes OA2 extend in the horizontal direction, the baseline length L1 becomes 60 mm, which is approximately equal to the eye width of an adult. The diameter ΦD of the lens mount 202 can be made shorter than the baseline length L1. Making the distance L2 between the left and right third optical axes OA3 shorter than the diameter ΦD of the lens mount 202 can arrange the third-unit lenses 230R and 230L on the third optical axis OA3 inside (on the inner circumference of) the lens mount 202.

Thus, in this embodiment, the distance (baseline length L1) between the first optical axes OA1R and OA1L in the two optical systems is longer than the diameter φD of the lens mount 202, and the distance L2 between the third optical axes OA3R and OA3L in the two optical systems is shorter than the diameter φD of the lens mount 202. In each of the two optical systems, all the third lenses (third-unit lens 230) may be disposed within the range of the diameter of the lens mount. In each of the two optical systems, at least part of the third lens may be disposed closer to the image plane than the flange surface 202F of the lens mount. In each of the two optical systems, the second optical axis may be disposed closer to the object than the flange surface 202F of the lens mount.

This embodiment can provide a compact lens apparatus and image pickup apparatus, each of which can properly set a baseline length and obtain a natural stereoscopic effect.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2019-170173, filed on Sep. 19, 2019, and 2020-103751, filed on Jun. 16, 2020, each of which is hereby incorporated by reference herein in its entirety.

What is claimed is:

1. A lens apparatus comprising:
a first optical system;
a second optical system disposed in parallel with the first optical system; and
a lens mount attachable to a camera body,
wherein each of the first optical system and the second optical system has a first optical axis, a second optical axis, and a third optical axis in order from an object side to an image side,
wherein a distance between the first optical axis of the first optical system and the first optical axis of the second optical system is longer than a diameter of the lens mount, and a distance between the third optical axis of the first optical system and the third optical axis of the second optical system is shorter than the diameter of the lens mount, and
wherein each of the first optical system and the second optical system includes a first lens provided on the first optical axis, a second lens provided on the second optical axis, and a third lens provided on the third optical axis.

2. The lens apparatus according to claim 1, wherein each of the first optical system and the second optical system includes a bending optical system having a first reflective surface and a second reflective surface,
wherein the first reflective surface reflects and bends a light beam of the first optical axis into a light flux of the second optical axis, and
wherein the second reflective surface reflects and bends the light flux of the second optical axis into a light flux of the third optical axis.

3. The lens apparatus according to claim 1, wherein the third optical axis is parallel to the first optical axis.

4. The lens apparatus according to claim 1, wherein the second optical axis is orthogonal to the first optical axis.

5. The lens apparatus according to claim 1, wherein in each of the first optical system and the second optical system, the third lens is disposed within a range of the diameter of the lens mount.

6. The lens apparatus according to claim 1, wherein in each of the first optical system and the second optical system, at least part of the third lens is disposed on an image side of a flange surface of the lens mount.

7. The lens apparatus according to claim 1, wherein in each of the first optical system and the second optical system, the second optical axis is disposed on the object side of a flange surface of the lens mount.

8. The lens apparatus according to claim 1, wherein the first optical system and the second optical system are symmetrically arranged.

9. The lens apparatus according to claim 1, wherein the lens apparatus is a lens apparatus for stereoscopic photography capable of forming two images with a parallax through the first optical system and the second optical system.

10. The lens apparatus according to claim 1, wherein each of the first optical system and the second optical system includes a wide-angle fisheye lens.

11. The lens apparatus according to claim 1, wherein each of the first optical system and the second optical system includes an all-round fisheye lens.

12. The lens apparatus according to claim 1, wherein each of the first optical system and the second optical system is independently focusable.

13. An image pickup apparatus comprising:
the lens apparatus according to claim 1; and
a camera body configured to hold an image sensor.

14. An image pickup apparatus according to claim 13, wherein the image sensor includes a single image sensor that captures a first image formed by the first optical system and a second image formed by the second optical system, which are arranged in parallel.

15. The image pickup apparatus according to claim 13, wherein the lens apparatus is attachable to and detachable from the camera body.

16. The lens apparatus according to claim 2, further comprising an operation member disposed on the image side of the first reflective surface.

17. The lens apparatus according to claim 16, wherein the operation member is disposed at a position overlapping the first reflective surface when viewed along the first optical axis.

18. The lens apparatus according to claim 16, wherein the third optical axis of each of the first optical system and the second optical system is disposed on an inner circumference of the operation member.

19. The lens apparatus according to claim 16, wherein the operation member is rotatable coaxially with the lens mount.

20. The lens apparatus according to claim 16, wherein the operation member includes an operation member for focusing.

21. The lens apparatus according to claim 16, wherein operating the operation member provides focusing to both of the first optical system and the second optical system.

22. The lens apparatus according to claim 21, further comprising a lens support member configured to fix the first optical system and the second optical system,
   wherein operating the operation member moves the lens support member back and forth.

23. The lens apparatus according to claim 22, wherein the operation member has a cam shape that changes a thickness depending on a rotation phase, and
   wherein sandwiching the cam shape of the operation member between the lens support member and the lens mount moves the lens support member back and forth as the operation member rotates.

24. The lens apparatus according to claim 16, wherein the operation member includes an operation member for adjusting an angle of view.

25. The lens apparatus according to claim 16, wherein the operation member includes an operation member for adjusting a diaphragm.

26. An image pickup apparatus comprising:
   the lens apparatus according to claim 16; and
   a camera body configured to hold an image sensor,
   wherein the operation member does not protrude from a bottom surface of the camera body.

* * * * *